No. 856,763. PATENTED JUNE 11, 1907.
R. J. BROOKS.
DRIVING AND REVERSING GEAR.
APPLICATION FILED OCT. 15, 1906.

3 SHEETS—SHEET 3.

WITNESSES:
Fred White
René Bruine

INVENTOR:
Robert James Brooks,
By his Attorneys

UNITED STATES PATENT OFFICE.

ROBERT JAMES BROOKS, OF TEDDINGTON, ENGLAND.

DRIVING AND REVERSING GEAR.

No. 856,763.  Specification of Letters Patent.  Patented June 11, 1907.

Application filed October 15, 1906. Serial No. 339,021.

*To all whom it may concern:*

Be it known that I, ROBERT JAMES BROOKS, of Cedar Road, Teddington, Surrey, England, have invented certain new and useful Improvements in or Relating to Driving and Reversing Gear, of which the following is a specification.

This invention relates to driving and reversing gear more especially as applied to launches.

The object of this invention is to provide a gear of the above type which may be readily inspected while running and to otherwise generally improve the construction of such gear.

Figure 1:
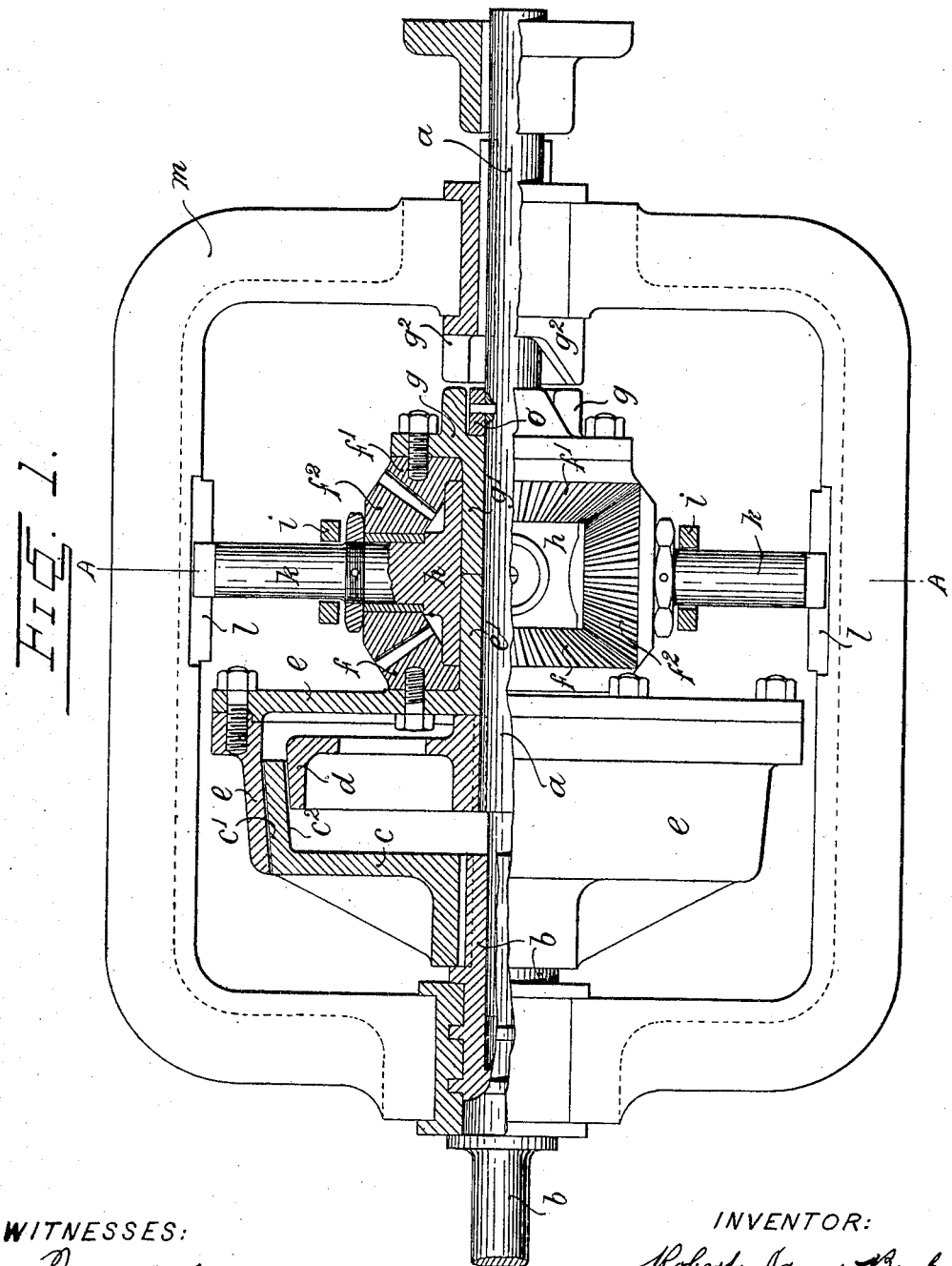
Figure 2:
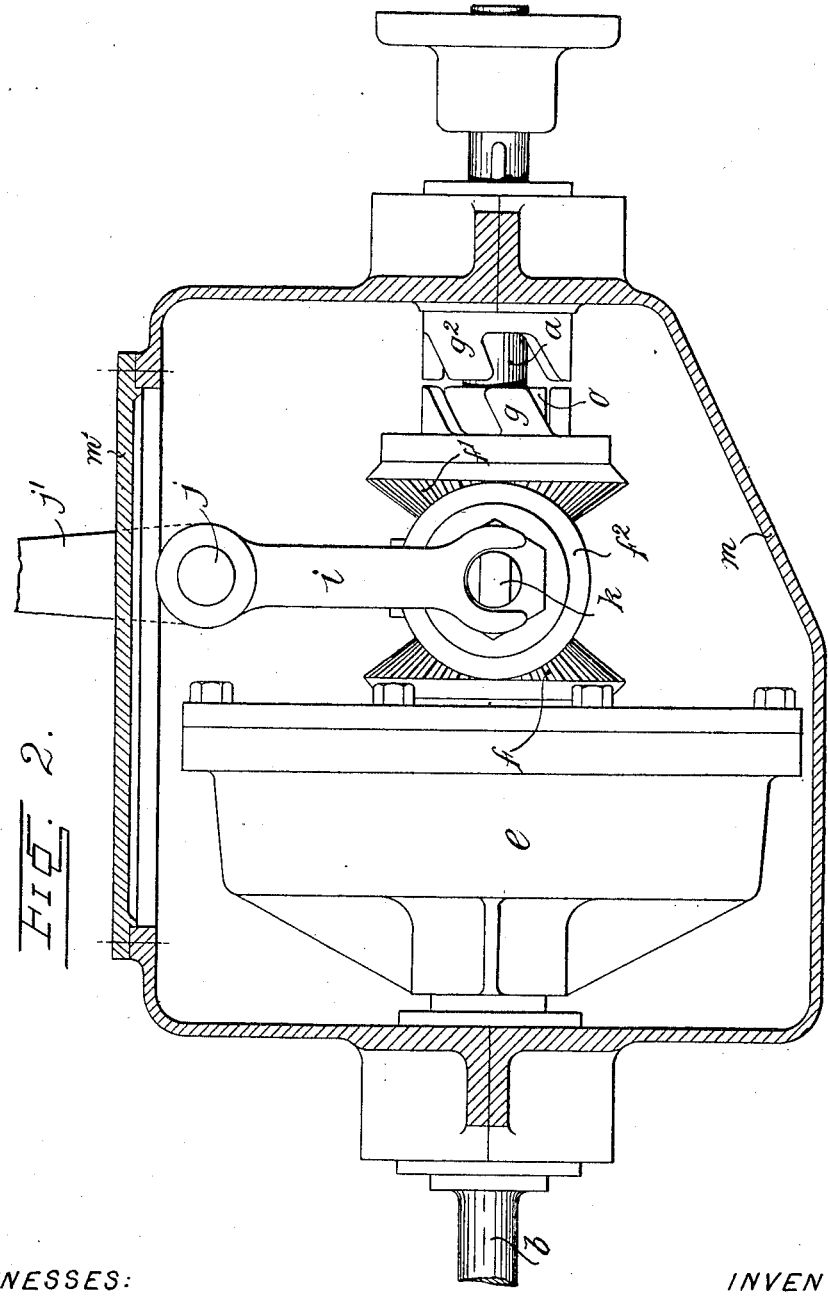
Figure 3:
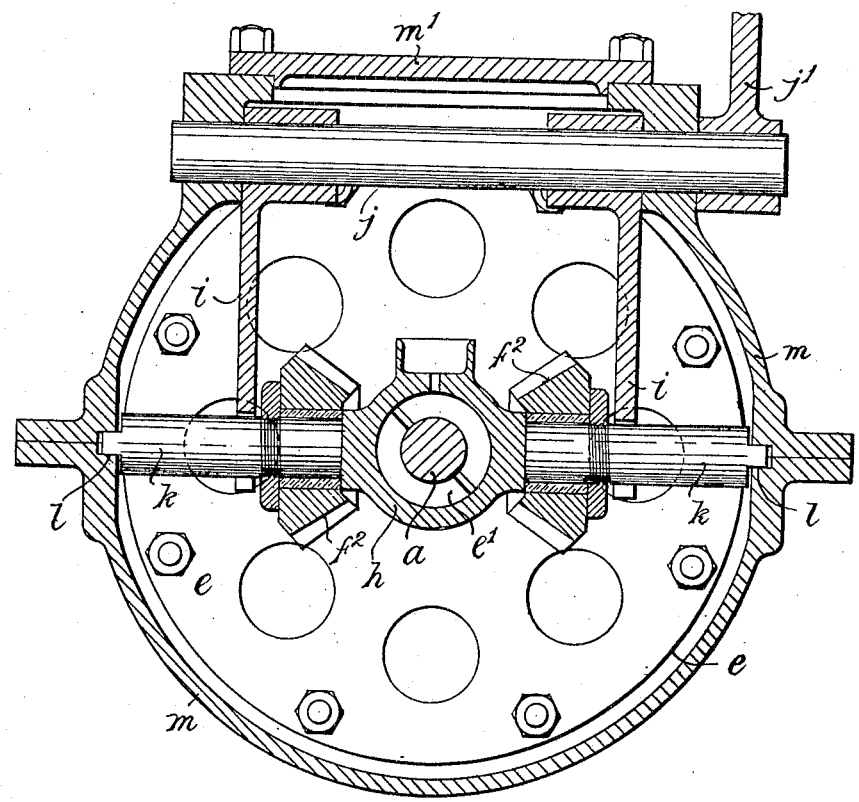

The accompanying drawings illustrate one form of the invention as applied to drive a propeller in a motor launch, in which Figure 1 is a part sectional plan, Fig. 2 a side elevation with the casing in section, and Fig. 3 is a section on line A—A of Fig. 1.

The driven or propeller shaft $a$ is adapted to slide within or in regard to the motor shaft $b$ to admit of the requisite sliding movement of the gear. The motor shaft $b$ carries a clutch $c$ of the cone type formed with clutching surfaces $c'$ $c^2$ on its periphery and inner edges respectively. A coned clutch member $d$ is mounted near the end of the driven shaft $a$ and adapted to slide therewith into and out of gear with the inner face $c^2$ of the motor clutch $c$; rearwardly beyond the direct driving clutch $d$ is mounted a reversing clutch member $e$ adapted to project over the motor clutch $c$ and to be moved into and out of engagement with the peripheral clutch surface $c'$ thereof. The reversing clutch member $e$ is adapted to rotate freely upon the driven shaft $a$ being mounted thereon by a sleeve like bearing $e'$. This clutch member $e$ carries a gear wheel $f$ which drives a second gear wheel $f'$ by means of the intermediate bevel wheels $f^2$ $f^2$. The gear wheel $f'$ is carried upon the second reversing clutch member $g$ which in turn is freely mounted upon the shaft $a$ by a sleeve like bearing $g'$. This second reversing clutch member $g$ is adapted to drive a correspondingly shaped clutch member $g^2$ suitably mounted in the casing so as to be prevented from longitudinal movement, which clutch member $g^2$ imparts its motion to the shaft $a$ by means of a feather and groove connection as shown.

The intermediate bevel wheels $f^2$ $f^2$ are carried upon a ring $h$ which is freely mounted upon sleeve-like extensions $e'$ $g'$ of the freely mounted clutch members $e$ and $g$ respectively. Longitudinal motion is communicated to this ring $h$ by levers $i$ and is transmitted by suitable means to the driven or propeller shaft and the clutch members $e$ and $g$ adapted to be slid with it. For instance, a collar such as $o$ may be fitted to or formed on the driven or propeller shaft at the end or ends of the sliding reversing gear or in other suitable position. The levers $i$ $i$ are mounted upon a suitable spindle $j$ which is also provided with another arm or controlling lever $j'$. The said levers $i$ $i$ are bifurcated at their ends and engage arms or extensions $k$ formed upon the bearings or spindles of the intermediate wheels $f^2$ $f^2$ and the said arms or extensions $k$ are adapted to slide in guides $l$ formed on the casing so as to prevent rotation of the said frame $h$. A forward movement of the levers $i$ puts the direct clutch $d$ into gear with the motor clutch $c$ while a rearward movement of said levers first puts the direct clutch $d$ out of gear with the motor clutch $c$ and then serves to put the second reversing clutch member $g$ into gear with the final clutch member $g^2$ and finally by further movement, presses said reversing clutch $e$ into gear with the motor clutch $c$.

When the driven shaft is formed by an extension of the propeller shaft as shown in the drawings, the thrust of the propeller will act in both forward and reversing motion to keep the clutch members in engagement.

Any suitable means may be provided for locking or retaining the controlling lever $j'$ in the position to which it is moved.

In some forms of the invention the final clutch member is adapted to slide rearwardly upon the driven shaft against the action of suitable springs mounted on spindles and adjusted suitably. The said sliding clutch member may if required be guided by extending as a sleeve through the bearing in the gear frame, and the springs may bear upon a sleeve or rings outside the frame.

Other types of clutches may be substituted for those illustrated, the parts being appropriately modified to suit the particular form of clutch employed, for instance if a toothed clutch is substituted for the cone clutches, $c$, $d$, $e$, the motor clutch may have the engaging teeth for the driving and reversing clutches respectively on its opposite sides.

In some cases what is described as the driven or propeller shaft may become the motor driven shaft and what was the motor shaft will become the propeller or driven shaft, in which case suitable means will be provided in the way of a sliding connection to allow of the requisite sliding motion of the reversing gear and a thrust block will be provided for taking the thrust of the propeller.

By constructing the gear in the manner described, the forward driving connection is through the motor clutch and direct to the driven shaft without the intervention of any toothed gear wheels, and further the reversing gear and its two clutch members need not be allowed to rotate with the shaft when out of gear therewith.

The gear may be inclosed in a suitable casing $m$ on the upper half of which is disposed a cover $m'$ which can be removed at any time without disconnecting any parts of the driving or reversing mechanism and thus the gear can be inspected even when running.

What I claim and desire to secure by Letters Patent is:—

1. A driving and reversing gear comprising the combination of a driven shaft, a motor clutch device, a clutch member coacting therewith and adapted to drive the driven shaft direct, a reversing clutch member also adapted to coact with the motor clutch device mounted freely upon the driven shaft, a final clutch member adapted to be coupled to the driven shaft, bevel gearing between the reversing clutch member and the final clutch member, and means whereby the driven shaft, bevel gearing and reversing clutch members may be slid longitudinally to couple the motor clutch device directly to the driven shaft, or to drive the same through the reversing clutch, bevel gear and final clutch substantially as set forth.

2. A driving and reversing gear comprising the combination of a driven shaft, a motor clutch device, a clutch member coacting therewith and adapted to drive the driven shaft direct, a reversing clutch member, a sleeve-like bearing on the driven shaft for said reversing clutch member, a train of bevel wheels the first of which is carried by said sleeve like bearing of the reversing clutch member, a second sleeve on the driven shaft carrying the last wheel of the train of bevel wheels, a non-rotatable frame carrying the intermediate wheels of said train of bevel wheels, said frame being freely mounted upon the said sleeve so as to allow of the rotation of said sleeves, extended spindles upon the frame for the said intermediate bevel wheels, guides in the gear frame for said extended spindles and in which the spindles are adapted to slide, a pivoted lever engaging said spindles so as to slide the same together with the bevel gears, the reversing clutch member and the direct driving clutch member as a whole, a final clutch member fitted at the outer end of said second sleeve, and a clutch member on the driven shaft adapted to come into engagement with said final clutch member when the reversing clutch member is put into action substantially as set forth.

In witness whereof, I have hereunto signed my name in the presence of two subscribing witnesses.

ROBERT JAMES BROOKS.

Witnesses:
  HENRY ALLEN PRYOR,
  ROBERT MILTON SPEARPOINT.